(12) United States Patent
Kobayashi

(10) Patent No.: US 8,864,224 B2
(45) Date of Patent: Oct. 21, 2014

(54) VEHICLE SEAT

(75) Inventor: Hideki Kobayashi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 114 days.

(21) Appl. No.: 13/519,614

(22) PCT Filed: Dec. 22, 2010

(86) PCT No.: PCT/JP2010/073182
§ 371 (c)(1),
(2), (4) Date: Jun. 28, 2012

(87) PCT Pub. No.: WO2011/081073
PCT Pub. Date: Jul. 7, 2011

(65) Prior Publication Data
US 2012/0299351 A1  Nov. 29, 2012

(30) Foreign Application Priority Data

Dec. 28, 2009 (JP) ................................ 2009-298025

(51) Int. Cl.
*A47C 13/00* (2006.01)
*B60N 2/46* (2006.01)
*B60N 2/36* (2006.01)
*B60N 2/30* (2006.01)
*B60N 2/44* (2006.01)

(52) U.S. Cl.
CPC ......... *B60N 2/4613* (2013.01); *B60N 2002/445* (2013.01); *B60N 2205/40* (2013.01); *B60N 2205/30* (2013.01); *B60N 2/366* (2013.01); *B60N 2/3011* (2013.01); *B60N 2205/35* (2013.01); *B60N 2/36* (2013.01)

USPC ................. 297/113; 297/378.12; 297/411.32; 297/378.13; 297/115; 297/117

(58) Field of Classification Search
USPC ............... 297/115, 117, 411.32, 378.12, 113, 297/378.13
See application file for complete search history.

(56) References Cited

U.S. PATENT DOCUMENTS

| 5,297,839 A * | 3/1994 | Fukushima .................... 297/117 |
| 6,572,188 B2 * | 6/2003 | Ozawa ...................... 297/411.32 |
| 7,837,267 B2 * | 11/2010 | Zink et al. ............ 297/378.12 X |

FOREIGN PATENT DOCUMENTS

| JP | 02-71037 U | | 5/1990 |
| JP | 03118234 A | * | 5/1991 |
| JP | 2002-079860 A | | 3/2002 |
| JP | 2006-181053 A | | 7/2006 |
| JP | 2006-271643 A | | 10/2006 |

* cited by examiner

*Primary Examiner* — Anthony D Barfield
(74) *Attorney, Agent, or Firm* — Drinker Biddle & Reath LLP

(57) ABSTRACT

Provided is a vehicle seat capable of reliably moving a seat cushion or a seat back to a folded position by remote control without deformation or the like of an armrest. A vehicle seat has a seat cushion, a seat back, and an armrest movable between a use position and a stowed position, in which at least one of the seat cushion and the seat back is movable from a seated position to a folded position, and a remote control restraint element for restraining movement of the movable seat cushion or the movable seat back in the direction of the folded position when the armrest is at the use position is provided.

20 Claims, 11 Drawing Sheets

VEHICLE SEAT

CROSS REFERENCE TO RELATED APPLICATIONS

This application is the U.S. national phase of the International Patent Application No. PCT/JP2010/073182 filed Dec. 22, 2010, which claims the benefit of Japanese Patent Application No. 2009-298025 filed Dec. 28, 2009, the entire content of which is incorporated herein by reference.

BACKGROUND

The invention relates to a vehicle seat. Disclosed herein are embodiments of a vehicle seat capable of moving a seat back or a seat cushion from a seated position to a pull-down position or a flip-up position (a folded position) by remote control.

Conventionally, there is a known a vehicle seat capable of enlarging a load chamber space provided on the rear side of a rear seat by pulling down a seat back of the rear seat or flipping up a seat cushion to move the seat to a predetermined position. For example, Japanese Patent Document No. 2002-079860 ("the '860 Patent Document") discloses a technique in which a seat back of a rear seat is pulled down by operating a remote control portion provided on the rear end side of a load chamber portion, to enlarge a load chamber space (refer to the '860 Patent Document). According to this technique, at the time of enlarging the load chamber space, without directly operating an operation portion provided in a vehicle seat, a seat back can be pulled down by remote control. Thus, the load chamber space can be easily and promptly enlarged.

In recent years, among such vehicle seats, there is a widely known vehicle seat including an armrest pivotably supported on a seat back, the armrest being movable in the front and rear direction between a use position and a stowed position (refer to Japanese Patent Document No. 2006-271643 ("the '643 Patent Document")).

The stowing technique of the vehicle seat described in the '860 Patent Document can also be applied to the vehicle seat including the armrest described in the '643 Patent Document.

However, in such a case, when the seat back is pulled down by operating the remote control portion while the armrest remains at the use position, the armrest is firstly brought into contact with the seat cushion of the vehicle seat. Thus, a situation that the seat back is stopped before reaching a proper pull-down position is caused. In such a case, in order to move the seat back to the proper pull-down position, a passenger has to move the armrest to the stowed position, and there is a problem that an enlargement task of the load chamber space is extremely troublesome.

As described above, when the armrest is brought into contact with the seat cushion, there is a disadvantage that the armrest is deformed due to impact thereof. Further, there are often cases where a cup holder, a housing box, and the like are attached to the armrest. When the seat back is operated in a state in which a drink or the like is disposed, there is also a disadvantage that the drink is sandwiched between the armrest and the seat back and spilled. Even in a type of vehicle seat capable of enlarging a load chamber space by flipping up a seat cushion, similar disadvantages are caused.

SUMMARY

Various embodiments of the invention may solve one or more of the above disadvantages. Described herein is a vehicle seat capable of moving a seat cushion or a seat back to a folded position by remote control without deformation or the like of an armrest.

A vehicle seat according to an embodiment comprises a seat cushion, a seat back, and an armrest movable between a use position and a stowed position, in which at least one of the seat cushion and the seat back is movable from a seated position to a folded position, and the vehicle seat includes a restraint element for restraining movement of the movable seat cushion or the movable seat back in the direction of the folded position when the armrest is at the use position.

With the above configuration, by restraining the movement of the seat cushion or the seat back in the direction of the folded position using the restraint element when the armrest is at the use position, the seat cushion or the seat back can be moved without deformation or the like of the armrest. Even when a drink or the like is disposed in the armrest, the drink is not spilled due to the movement of the seat cushion or the seat back.

In an embodiment, the vehicle seat includes a bias element for biasing the seat back or the seat cushion in the direction in which the seat back or the seat cushion is moved from the seated position to the folded position, a lock capable of being selectively switched between a lock state in which the seat back is fixable at the seated position and a lock cancellation state in which the movement of the seat back from the seated position to the folded position is permitted, a remote control unit capable of shifting the lock from the lock state to the lock cancellation state, and a coupling element for coupling the lock and the remote control unit, in which the coupling element has a lock side coupling member connected to the lock, a remote control unit side coupling member connected to the remote control unit, and a connection member for connecting the lock side coupling member and the remote control unit side coupling member, the restraint element has a conjunction element moved in conjunction with movement of the armrest, and a switch connected to the conjunction element, capable of being selectively switched between a movement restraint state in which movement of the connection member is restrained when the armrest is moved to the use position, and a movement permission state in which the movement of the connection member is permitted when the armrest is moved to the stowed position, and the restraint element restrains the lock from shifting from the lock state to the lock cancellation state by operation of the remote control unit.

With the above configuration, by moving the armrest to the stowed position, the connection member can be moved, and shift of the lock to the lock cancellation state can be permitted. That is, in a state in which the armrest is at the use position, even when the remote control unit is operated, the seat cushion or the seat back is never moved to the folded position. After the armrest is moved to the stowed position, the operation of the remote control unit is activated, so that the seat cushion or the seat back can be moved to the folded position. Therefore, when the armrest is at the use position, an action of the seat cushion or the seat back by remote control can be more reliably prevented.

In an embodiment, the connection member has an engagement portion, and the switch has a base member and a locking portion engageable with the engagement portion, and has a pivot member connected to the conjunction element and pivotably supported on the base member, and a bias member for biasing the pivot member in the direction in which the locking portion and the engagement portion are engaged.

With such a configuration, since a bias force is always applied to the pivot member having the locking portion in the direction in which the locking portion is engaged with the engagement portion of the connection member, the engagement portion and the locking portion can be reliably and firmly engaged. Therefore, even when improper operation of the remote control unit is performed with the armrest at the use position, the movement of the seat cushion or the seat back can be reliably prevented.

In an embodiment, a guide portion for guiding the locking portion in a manner that the locking portion is engaged with the engagement portion is formed in the connection member.

For example, in the case where the armrest is moved from the stowed position to the use position during the operation of the remote control unit, and when the operation of the remote control unit is stopped after that, the connection member starts the movement to the side of the lock in a state in which the locking portion of the switch is moved to the side of the connection member side. Even in such a case, with the above configuration, the guide portion provided from a front end on the side of the lock side coupling member to the engagement portion is formed in the connection member. Thus, the locking portion of the switch can be smoothly guided by the guide portion and engaged with the engagement portion of the connection member. In such a way, in the case where the armrest is at the use position, and even in a state in which the locking portion of the switch and the engagement portion of the connection member are not engaged, these portions can be smoothly and reliably engaged with each other.

With an embodiment of the vehicle seat described above, the seat cushion or the seat back can be reliably moved to the folded position by the remote control without the deformation or the like of the armrest.

With an embodiment of the vehicle seat described above, when the armrest is at the use position, the action of the seat cushion or the seat back by the remote control can be more reliably prevented.

With an embodiment of the vehicle seat described above, by biasing the pivot member in the engagement direction by the bias element, engagement is reliably performed with the armrest at the use position, so that the actuation of the seat cushion or the seat back by the remote control unit can be restrained.

With an embodiment of the vehicle seat described above, in the case where the armrest is at the use position, and even in a state in which the locking portion of the switch and the engagement portion of the connection member are not engaged, these portions can be smoothly and reliably engaged.

BRIEF DESCRIPTION OF THE DRAWINGS

The following drawings illustrate various embodiments of the invention:

FIG. 7A is a view showing a state in which an armrest is at a use position and at a stowed position; and FIG. 7B is a view showing a state in which the remote control unit is operated in the case where the armrest is at the stowed position;

DETAILED DESCRIPTION

Hereinafter, embodiments according to the present invention will be described with reference to FIGS. 1 to 11. Members, arrangement, and the like described below do not limit the present invention but can be variously modified along the gist of the present invention, as a matter of course.

FIGS. 1 to 9 show a first embodiment of the present invention and describe a vehicle seat according to the present invention.

In the figures, FR denotes the front side of a vehicle, RR denotes the rear side of the vehicle, and UP denotes the upper side of the vehicle. The right and left direction in the following description indicates the right and left direction in a state in which a passenger sees the front side of the vehicle. A "seated position" of a seat cushion or a seat back indicates a position in a normal state in which the passenger can be seated, and a "folded position" of the seat cushion or the seat back indicates a position where the seat cushion is flipped up and folded to be close to the side of the seat back (flip-up position), and a position where the seat back is pulled down and folded to be close to the side of the seat cushion (pull-down position).

The vehicle seat according to the first embodiment is favorably mounted on a vehicle having a load chamber space in a rear part of a vehicle body of an automobile. The present embodiment shows an example in which the vehicle seat is mounted on a wagon type automobile.

Figure 1:
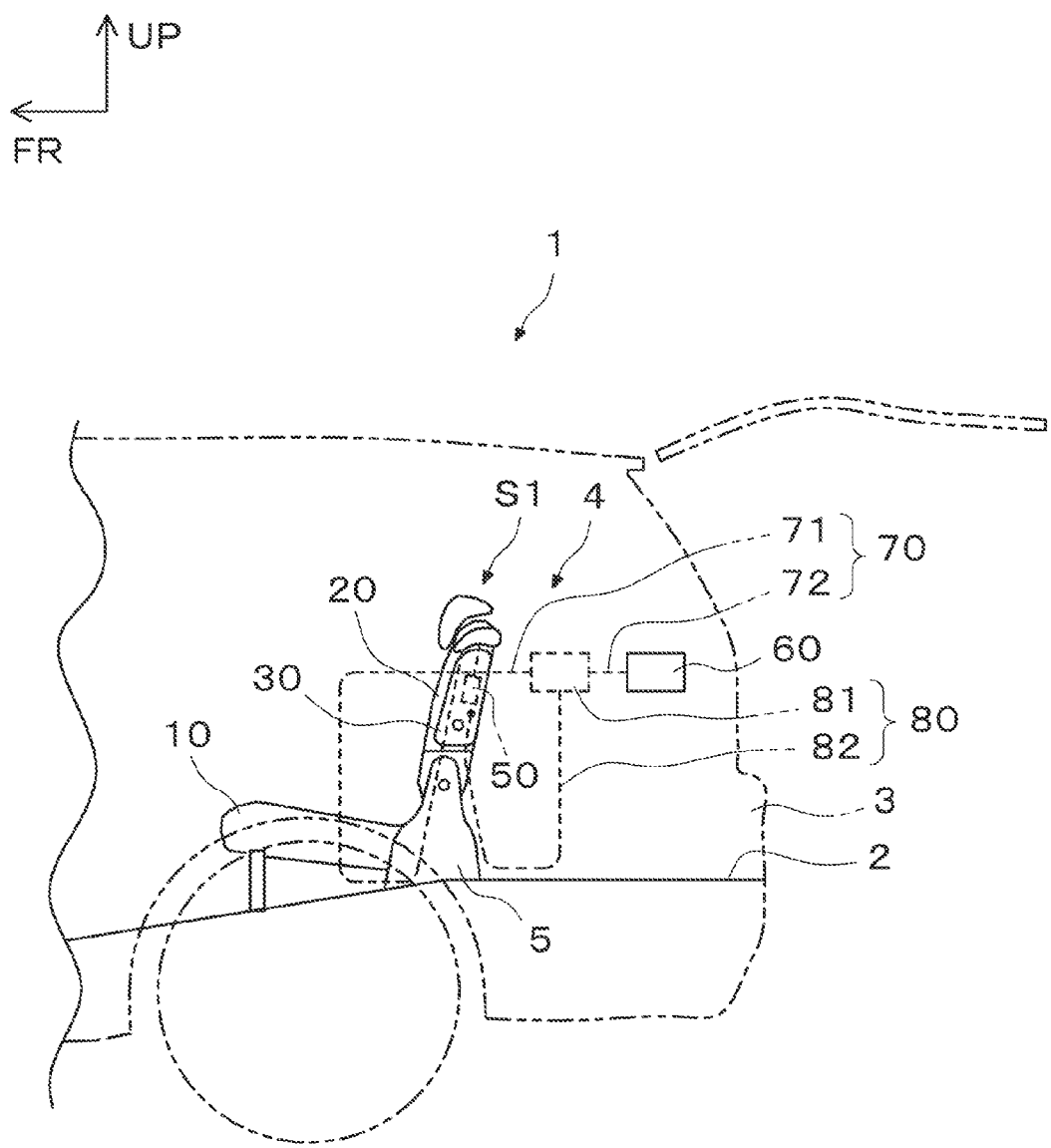
FIG. 1 is a schematic side view of a vehicle rear part having a vehicle seat according to a first embodiment of the present invention.

As shown in FIG. 1, a vehicle 1 according to the present embodiment is provided with a vehicle seat Si configuring a rear seat, and a load chamber (or rear storage) portion 3 configuring part of a vehicle body floor 2, for loading cargo and the like is formed on the rear side of the vehicle seat S1. With this load chamber portion 3, a space of the load chamber portion 3 can be appropriately enlarged or reduced by pivoting and moving a seat back 20 of the vehicle seat S1 described later in the vehicle body front and rear direction.

The vehicle seat S1 is provided with a seat cushion 10, the seat back 20, an armrest 30, and a seat stowing device 4.

The seat cushion 10 is provided with a known slide mechanism (not shown) including a lower rail, an upper rail, and the like in both right and left ends thereof, and configured slidably in the vehicle body front and rear direction by fixing this slide mechanism at a predetermined position of the vehicle body floor 2 (refer to FIG. 1).

Figure 2:
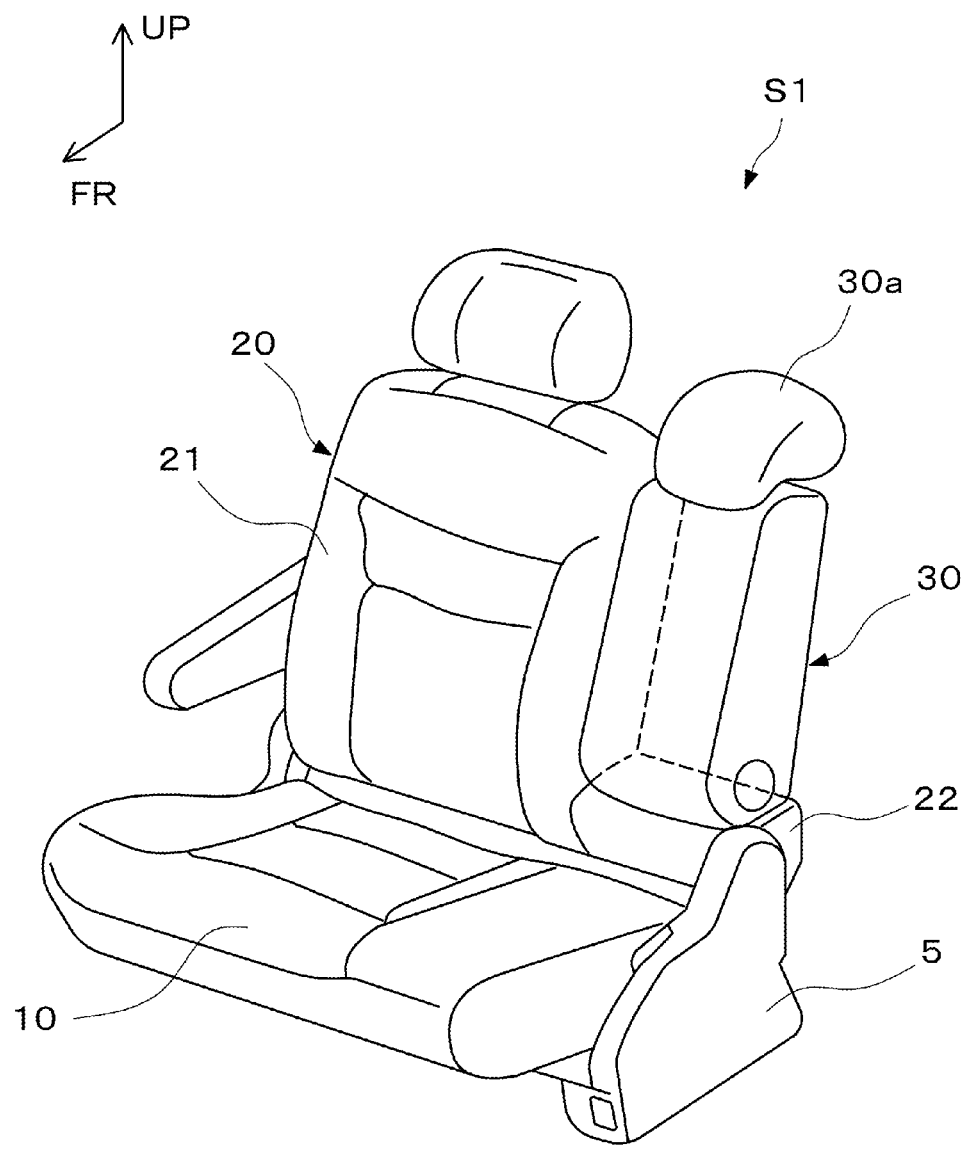
FIG. 2 is a perspective view of the vehicle seat.
Figure 3:
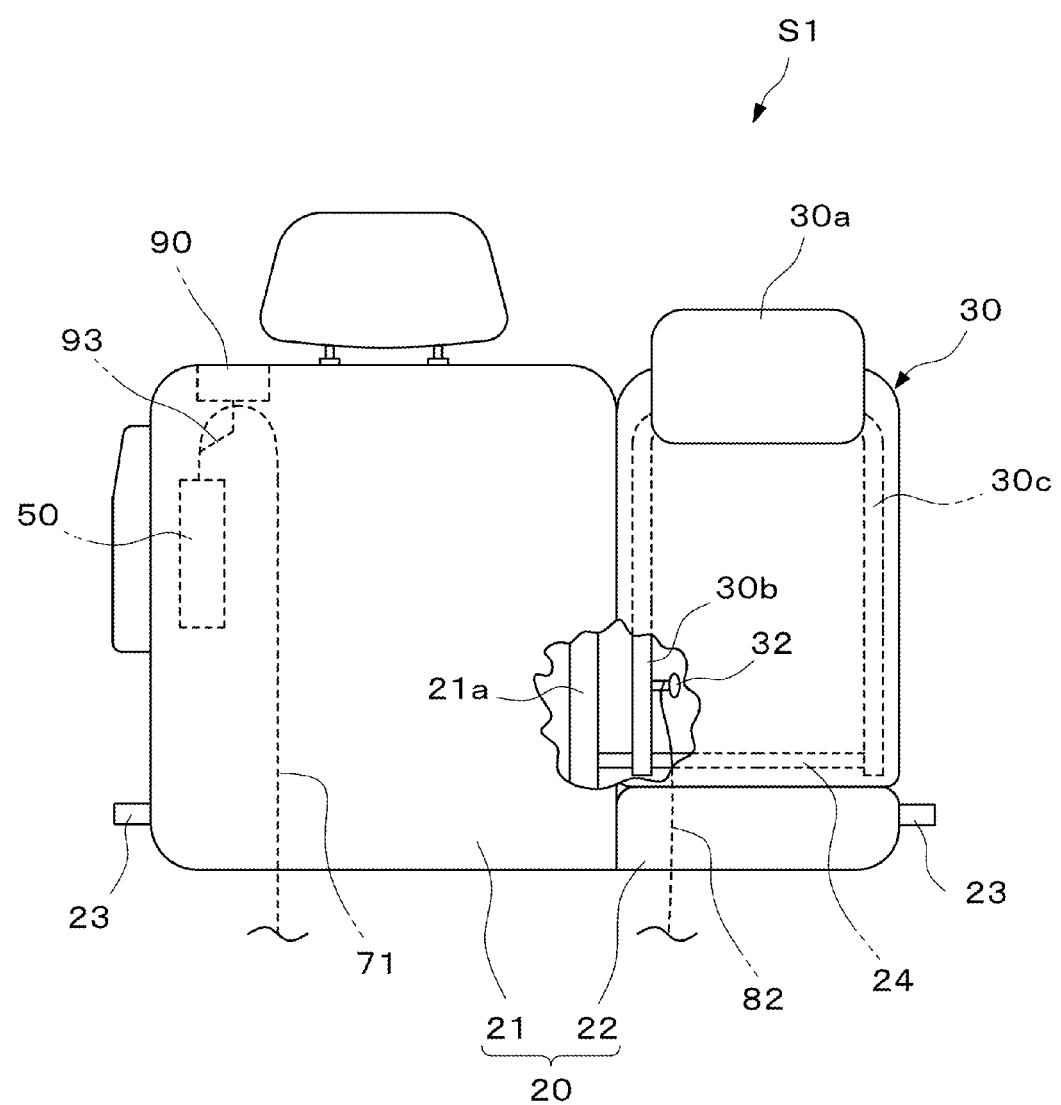
FIG. 3 is a plan view of FIG. 2.

As shown in FIGS. 2 and 3, the seat back 20 has a seat back main body 21 and a platform portion 22, and these portions are integrally formed. The platform portion 22 is provided to protrude from a right lower end of the seat back main body 21 in the right direction, and configured in a manner that the armrest 30 can be arranged on the upper side thereof.

In a left side frame (not shown) configuring a base frame of the seat back main body 21 and a right side frame (not shown) configuring a base frame of the platform portion 22, a pair of pivot shafts 23, 23 respectively protruding from both the right and left sides near lower ends thereof toward the outer sides in the lateral direction is provided. The pivot shafts 23 are configured to be inserted into hole portions (not shown) of a support member 5 fixed at a predetermined position of the vehicle body floor 2. By inserting the pivot shafts 23 thereof through the hole portions of the support member 5, the seat back 20 is pivotably supported on the vehicle body floor 2, and configured to be moved between a seated position where the passenger can be seated and a pull-down position (folded position) where the seat back is arranged to cover the seat cushion 10.

At a predetermined position of a right side frame 21a of the seat back main body 21 on the side of the platform portion 22, an axis 24 protruding on the upper side of the platform portion 22 from an outer surface of the right side frame on the side of the platform portion 22, the axis for attaching the armrest 30, is provided.

The armrest 30 according to the present embodiment has a headrest 30a, a pair of left and right side frames 30b, 30c configuring a base frame thereof, and an upper frame (not shown) for coupling upper ends of the left and right side frames 30b, 30c. At predetermined positions near lower ends of the left and right side frames 30b, 30c, hole portions (not shown) through which the axis 24 of the seat back 20 is insertable are respectively formed.

The armrest 30 configured in such a way is pivotably attached to the seat back 20 taking the axis 24 as a pivot center, to be moved between the use position where the armrest is mainly used as an arm support and a storage for a drink or the like and the stowed position where the armrest can support a lumbar part, a back part, and the like of the passenger from the rear side.

On the inner side of the left side frame 30b (on the side of the right side frame 30c), a fixing pin 32 protruding in the right direction is provided. This fixing pin 32 is fixed to the left side frame 30b by a screw, a bolt, or the like at a position spaced by a predetermined distance from the hole portion through which the axis 24 is insertable to the side of the headrest 30a. A second operation cable 82 described later is attached to this fixing pin 32 by a screw, a bolt, or the like. Attachment positions of this fixing pin 32 will be described later in detail.

Figure 9:
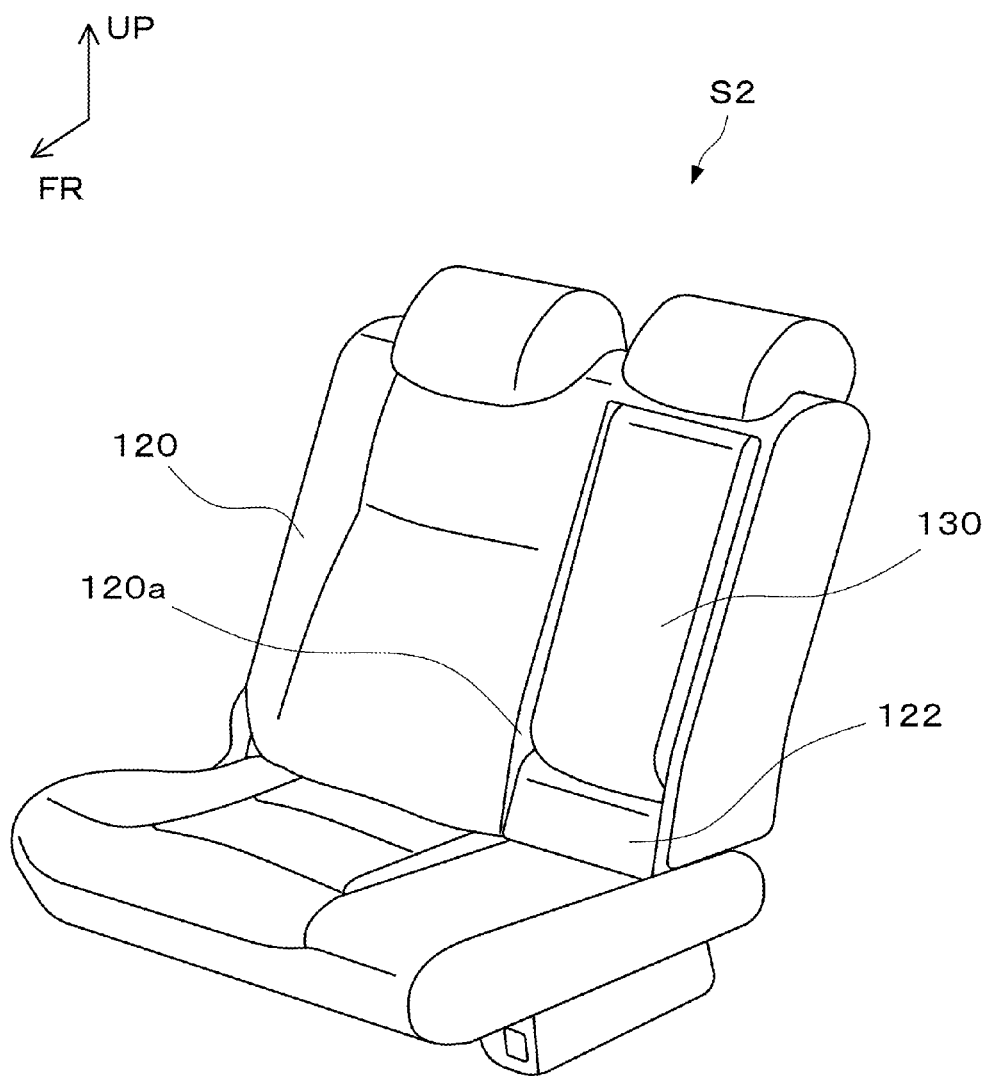
FIG. 9 is a perspective view of the vehicle seat showing another example.

An embodiment of a vehicle seat also includes a vehicle seat S2 as shown in FIG. 9 in addition to the vehicle seat Si described above. In the vehicle seat S2 shown in FIG. 9, a concave portion 120a is formed on a surface on the front side of a seat back 120 extending to a predetermined position on the upper side of a platform portion 122, and an armrest 130 movable between the use position and the stowed position is attached to the concave portion 120a. In such a vehicle seat S2, the seat stowing device 4 described below can also be provided.

Next, the seat stowing device 4 will be described with reference to FIG. 1 and FIGS. 3 to 8.

Figure 4:
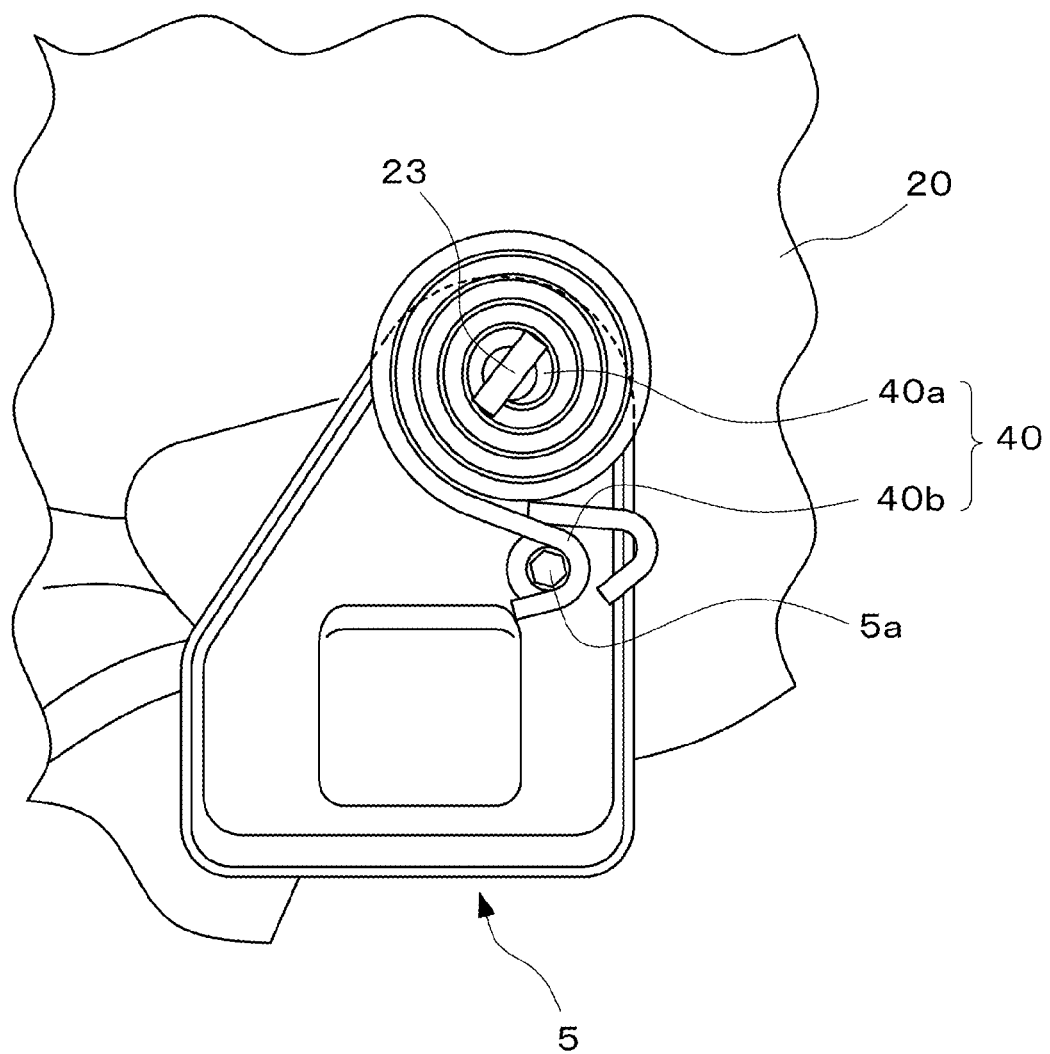
FIG. 4 is an enlarged side view of major parts of a seat back.

As shown in FIGS. 1 and 4, the seat stowing device 4 has a bias element 40, a lock 50, a remote control unit 60, a first operation cable 70, and a remote control restraint element 80. This first operation cable 70 corresponds to a coupling element of the claims.

As shown in FIG. 4, the bias element 40 is a spiral spring having one end 40a locked onto the pivot shaft 23 and the other end 40b caught and locked onto a locking pin 5a protrudingly formed in the support member 5. The bias element 40 applies a bias force in a manner that the seat back 20 is pivotable to the vehicle body front side taking the pivot shaft 23 as a pivot center.

Figure 5:
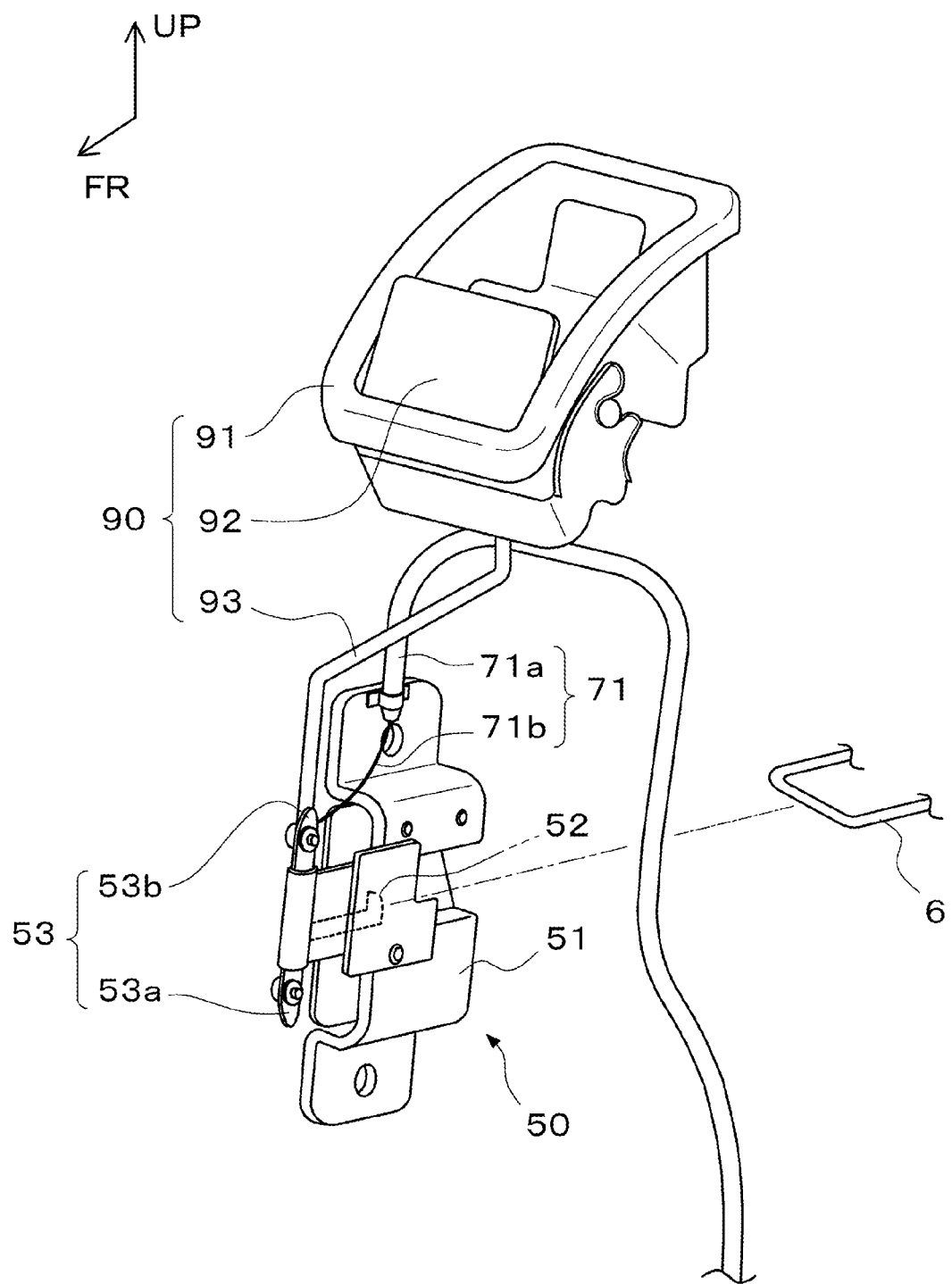
FIG. 5 is a perspective view of an operation portion and a lock.

As shown in FIG. 5, the lock 50 has a base portion 51, a lock piece 52, and a coupling portion 53. The base portion 51 is made of a metal plate shape member, and fixed at a predetermined position of the left side frame of the seat back 20 by a bolt or the like (refer to FIG. 3).

The lock piece 52 is made of a metal member, and is pivotably supported on the base portion 51 taking a support shaft (not shown) standingly fixed to the base portion 51 as a pivot center. This lock piece 52 is always biased by a twist spring (not shown) in the direction of a lock state in which a striker 6 fixed at a predetermined position on the side of the vehicle body can be locked. The lock piece 52 configured in such a way is brought into a lock cancellation state in which an engagement state with the striker 6 is cancelled when the lock piece is pivoted and moved in the direction against a bias force of the twist spring.

The coupling portion 53 is made of a metal member having a substantially plate shape, and attached to the base portion 51 to be slidable in the up and down direction. The coupling portion 53 has one end 53a and the other end 53b. The one end 53a is pivotably attached to a support shaft (not shown) standingly fixed at a predetermined position of the lock piece 52. A coupling rod 93 of an operation portion 90 and a cable member 71b of a lock side cable 71 described later are connected to the other end 53b by a bolt or the like.

As shown in FIGS. 3 and 5, the operation portion 90 has an operation cover 91 and an operation lever 92 pivotably supported on the operation cover 91. The operation cover 91 has a concave shape to stow the operation lever 92, and is fixed to the seat back 20 by a bolt or the like in a state in which a flange part thereof is abutted with an upper end of the seat back 20.

The operation lever 92 is biased by a bias element such as a twist spring in the direction in which the operation lever is stowed in the operation cover 91, and the coupling rod 93 made of a substantially zigzag shape metal member is coupled at a predetermined position thereof. This coupling rod 93 is configured to be moved upward in conjunction with upward pivot operation of the operation lever 92.

An operation force of the lock 50 configured in such a way is transmitted to the lock piece 52 via the coupling portion 53 in accordance with upward movement of the coupling portion 53, that is, movement of the coupling rod 93 by manual operation of the operation lever 92, or movement of the cable member 71b by manual operation of an operation handle 64 (refer to FIG. 6) of the remote control unit 60 described later. When such an operation force is transmitted to the lock piece 52, the lock piece 52 is pivoted and moved against the bias force of the twist spring, so that the lock 50 is brought into the lock cancellation state in which the engagement state with the striker 6 is cancelled.

On the other hand, when the manual operation of the operation lever 92 is stopped, the operation lever 92 is stowed in the operation cover 91 by the bias element for applying a bias force to this operation lever. In accordance with this, a downward operation force thereof is transmitted to the lock piece 52 via the coupling rod 93 and the coupling portion 53. When such an operation force is transmitted to the lock piece 52, the lock piece 52 is pivoted and moved in the direction in which the twist spring biases, so that the lock 50 is brought into the lock state in which the lock is engageable with the striker 6.

Next, the remote control unit 60 will be described with reference to FIGS. 1 and 6.

Figure 6:
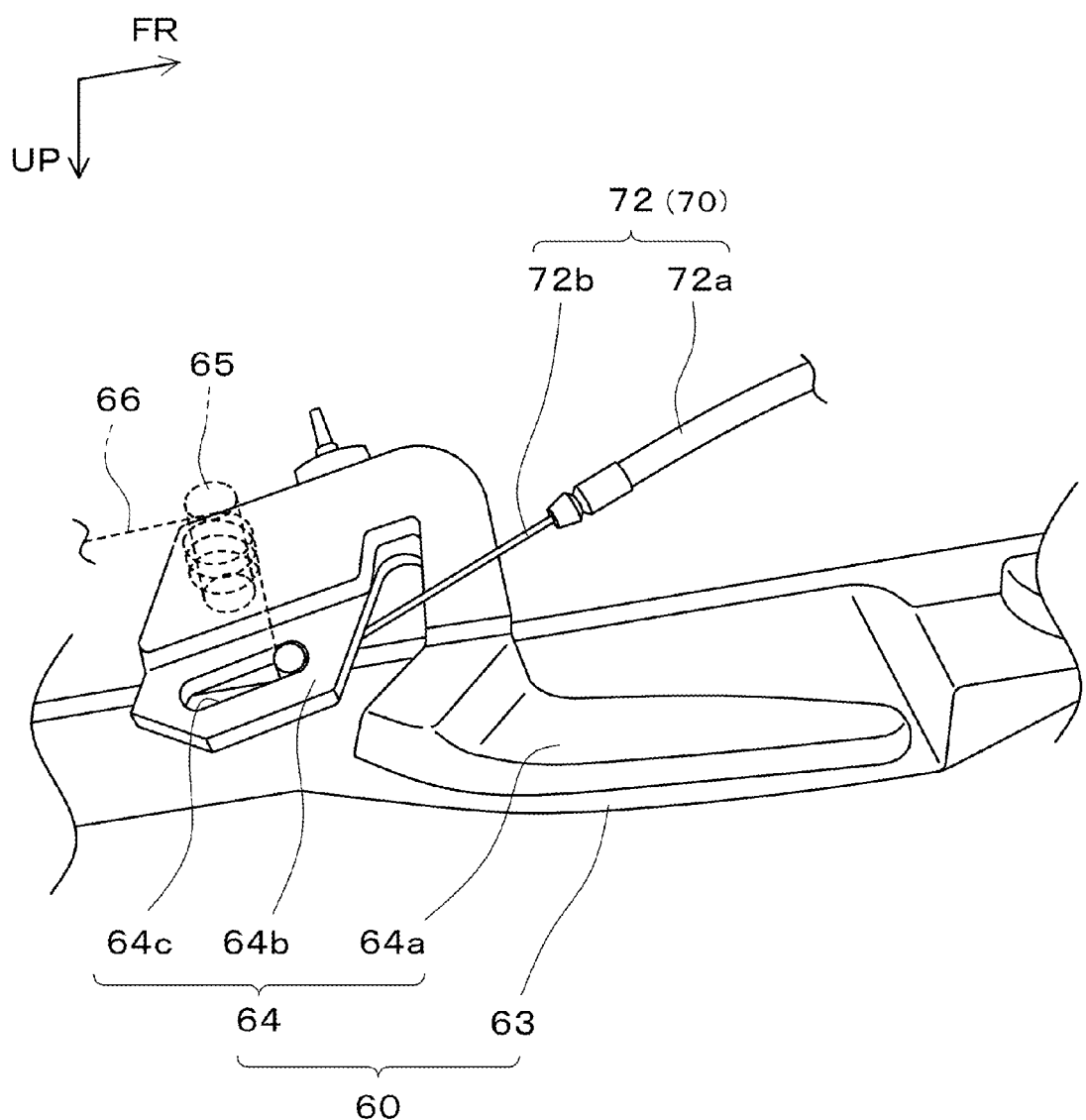
FIG. 6 is an enlarged perspective view of major parts of a remote control unit.
Figure 7A:
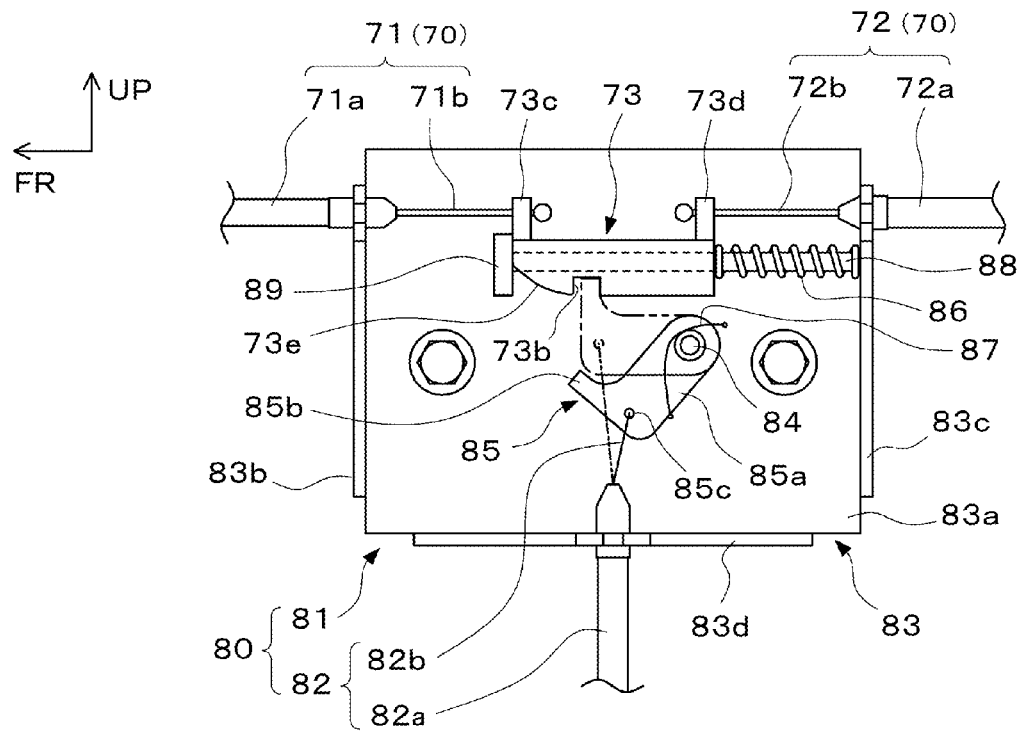
FIGS. 7A and 7B are plan views of a second lock.
Figure 7B:
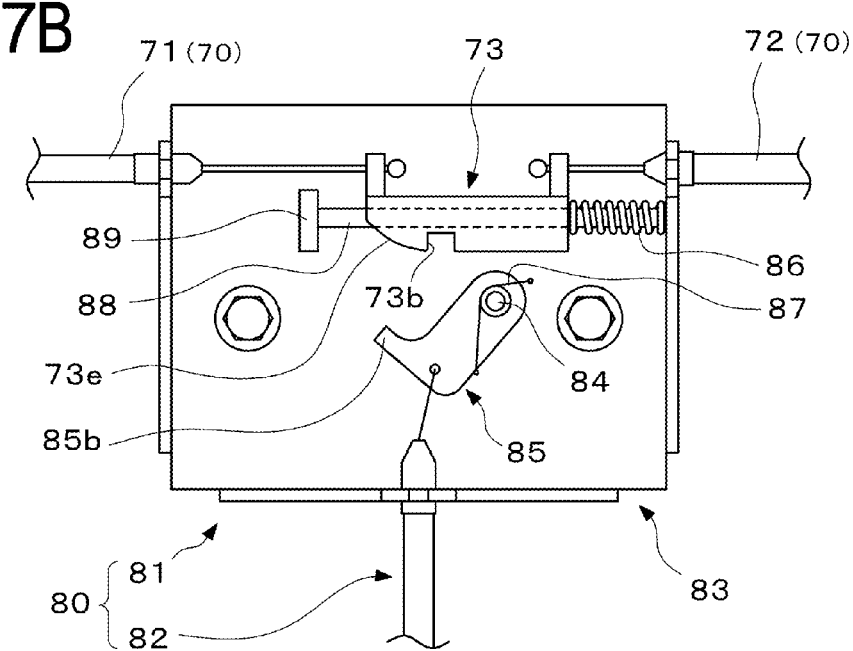

As shown in FIGS. 1 and 6, the remote control unit 60 is provided at a predetermined position of a rear end side wall surface of the load chamber portion 3, and has an operation cover 63 and the operation handle 64.

The operation cover 63 is fixed to a wall surface of the vehicle 1 by a bolt or the like.

The operation handle 64 has a grip portion 64a and an attachment portion 64b, and these portions are integrally formed. The attachment portion 64b has a hole portion (not shown) into which a shaft portion 65 standingly fixed at a predetermined position of the operation cover 63 is insertable, and a long hole 64c for movably attaching a front end of a cable member 72b of a remote control unit side cable 72 described later.

Next, assembling of the remote control unit 60 configured in such a way and attachment to the vehicle body will be described. Upon the assembling of the remote control unit 60, firstly, a twist spring 66 capable of always biasing the grip portion 64a of the operation handle 64 to the side of the operation cover 63 is installed in an outer circumference of the shaft portion 65 of the operation cover 63, and then, the shaft portion is inserted into the hole portion of the operation handle 64. The operation handle 64 is pivotably attached to the operation cover 63 in a state in which the operation handle is always biased to the side of the operation cover 63 by the twist spring 66.

Next, the remote control unit side cable 72 is attached to the long hole 64c of the operation handle 64, and then, the remote control unit 60 whose assembling is finished is attached to the vehicle body.

In such a way, in the remote control unit 60 attached to the vehicle body, when the operation handle 64 is manually operated against a bias force of the twist spring 66, the cable member 72b of the remote control unit side cable 72 is pulled toward the vehicle body rear side. When the operation handle 64 is released in this state, the operation handle 64 is stowed in the operation cover 63, and a force of pulling the cable member 72b is cancelled.

Next, the first operation cable 70 will be described with reference to FIGS. 1, 3, and FIGS. 5 to 7.

As shown in FIGS. 1, 3, and FIGS. 5 to 7, the first operation cable 70 has the lock side cable 71, the remote control unit side cable 72, and a connector member 73. The lock side cable 71, the remote control unit side cable 72, and the connector member 73 respectively correspond to a lock side coupling member, a remote control unit side coupling member, and a connection member.

As shown in FIGS. 5 and 7, the lock side cable 71 has a tube member 71a made of a flexible member, and the cable member 71b made of a linear member such as a wire, and couples the coupling portion 53 of the lock 50 and a first cable attachment portion 73c of the connector member 73 described later. The cable member 71b is inserted through the tube member 71 a, and configured to be moved in the tube member 71a.

The tube member 71a and the cable member 71b on the side of the lock 50 are respectively attached to the base portion 51 and the coupling portion 53 of the lock 50 by a bolt, a screw, or the like. The tube member 71a and the cable member 71b on the side of a second lock 81 are respectively attached to a front wall portion 83b of a base member 83 of the second lock 81 and the first cable attachment portion 73c of the connector member 73 by a bolt, a screw, or the like.

As shown in FIG. 1, the lock side cable 71 is arranged between the back side of a surface layer material (not shown) or the like disposed on a wall surface of the vehicle body floor 2 and the vehicle 1, and the vehicle body, while maintaining a predetermined curvature radius without bending.

As shown in FIGS. 6 and 7, the remote control unit side cable 72 has a tube member 72a made of a flexible member and the cable member 72b made of a linear member as well as the lock side cable 71, and couples the second lock 81 of the remote control restraint element 80 serving as a restraint element described later and the operation handle 64 of the remote control unit 60.

The tube member 72a and the cable member 72b on the side of the second lock 81 are respectively attached to a rear wall portion 83c of the base member 83 of the second lock 81 and a second cable attachment portion 73d of the connector member 73 described later by a bolt, a screw, or the like. The tube member 72a and the cable member 72b on the side of the remote control unit 60 are respectively attached to a predetermined position of the operation cover 63 of the remote control unit 60 and the long hole 64c of the operation handle 64 by a bolt, a screw, or the like.

As shown in FIG. 1, as well as the lock side cable 71, the remote control unit side cable 72 is arranged between the back side of the surface layer material (not shown) or the like disposed on the wall surface of the vehicle 1, and the vehicle body, while maintaining a predetermined curvature radius without bending.

As shown in FIG. 7, the connector member 73 has a substantially cylindrical shape, and couples the lock side cable 71 and the remote control unit side cable 72 in a state in which the connector member is attached to the base member 83 of the remote control restraint element 80 described later.

This connector member 73 has an engagement groove 73b, the first cable attachment portion 73c, the second cable attachment portion 73d, and a guide portion 73e. By inserting a shaft member 88 of the base member 83 described later into an opening portion (not shown) formed along the longitudinal direction thereof, the connector member 73 is attached to the base member 83 slidably in the vehicle body front and rear direction. This engagement groove 73b generally corresponds to an engagement portion described in the claims.

The engagement groove 73b is formed into a substantially concave shape at a predetermined position on a side surface of a main body of the connector member 73, and has a shape to be engageable with a claw portion 85b of a latch member 85 described later.

The first cable attachment portion 73c is standingly provided from a front end side surface of the main body of the connector member 73, and has a hole portion (not shown) into which the cable member 71b of the lock side cable 71 is insertable. The cable member 71b is connected to the first cable attachment portion 73c by inserting a front end thereof into the hole portion of the first cable attachment portion 73c and attaching a fixing member such as a fixing pin to the front end.

The second cable attachment portion 73d is standingly provided from a rear end side surface of the main body of the connector member 73, and has a hole portion (not shown) into which the cable member 72b of the remote control unit side cable 72 is insertable. The cable member 72b is connected to the second cable attachment portion 73d by inserting a front end thereof into the hole portion of the second cable attachment portion 73d and attaching a fixing member such as a fixing pin to the front end.

The guide portion 73e has a substantially-arc-shape curved surface curved to be tapered off toward a front end of the connector member 73 from the vehicle body front side of the engagement groove 73b in a sectional view. That is, this guide portion 73e is provided to have the curved surface from the front end of the connector member 73 on the side of the lock side cable 71 to the engagement groove 73b, and configured movably in a state in which the claw portion 85b of the latch member 85 described later is abutted with this curved surface.

Next, the remote control restraint element 80 serving as the restraint element of the present invention will be described with reference to FIGS. 1, 6, and 7.

As shown in FIGS. 1 and 7, the remote control restraint element 80 is provided with the second lock 81 and the second operation cable 82. The second lock 81 has the base member 83, the latch member 85, and a twist spring 87. The second lock 81 and the second operation cable 82 respectively generally correspond to a switch and a conjunction element described in the claims.

As shown FIG. 7, the base member 83 is made of a substantially plate shape metal, and has a base portion 83*a* fixed at a predetermined position of the wall surface of the vehicle 1 by a bolt or the like, the front wall portion 83*b* curved and extended from a front end of the base portion 83*a*, the rear wall portion 83*c* curved and extended from a rear end of the base portion 83*a*, and a lower wall portion 83*d* curved and extended from a lower end of the base portion 83*a*.

At a predetermined position of the base portion 83*a*, a pivot shaft 84 is standingly provided toward the inner side in the lateral direction, and as described later, the latch member 85 is pivotably attached to the base member 83 taking this pivot shaft 84 as a pivot center. In the rear wall portion 83*c*, the shaft member 88 formed into a substantially rod shape is standingly provided toward the vehicle body front side, and as described later, the connector member 73 is slidably attached along this shaft member 88.

At a predetermined position of the front wall portion 83*b*, a hole portion (not shown) into which the tube member 71*a* of the lock side cable 71 is insertable is formed. The tube member 71 a is attached to the front wall portion 83*b* by inserting a front end thereof into the hole portion of the front wall portion 83*b* and screwing a nut member onto a screw part formed in the front end, or the like.

At a predetermined position of the rear wall portion 83*c*, a hole portion (not shown) into which the tube member 72*a* of the remote control unit side cable 72 is insertable is formed. The tube member 72*a* is attached to the rear wall portion 83*c* by inserting a front end thereof into the hole portion of the rear wall portion 83*c* and screwing a nut member onto a screw part formed in the front end, or the like.

At a predetermined position of the lower wall portion 83*d*, a hole portion (not shown) into which a tube member 82*a* of the second operation cable 82 is insertable is formed. The tube member 82*a* is attached to the lower wall portion 83*d* by inserting a front end thereof into the hole portion of the lower wall portion 83*d* and screwing a nut member onto a screw part formed in the front end, or the like.

Next, assembling of the connector member 73 to the base member 83, the cable member 71*b*, and the cable member 72*b* will be described with reference to FIGS. 6 and 7.

Upon the assembling of these members, firstly, a compressed coil spring 86 is installed in an outer circumference of the shaft member 88 of the base member 83, and then, the shaft member 88 is inserted into the opening portion (not shown) of the connector member 73. After inserting into the connector member 73, a stopper member 89 is attached to a front end of the shaft member 88. The connector member 73 attached to the base member 83 in such a way receives a bias force of the compressed coil spring 86 and is always biased to the side of the stopper member 89 of the shaft member 88.

After that, the cable member 71*b* of the lock side cable 71 and the cable member 72*b* of the remote control unit side cable 72 are respectively attached to the first cable attachment portion 73*c* and the second cable attachment portion 73*d* of the connector member 73 by a screw, a bolt, and the like, so that the cable member 71*b* and the cable member 72*b* are coupled with each other.

In a state in which the connector member 73 coupling the lock side cable 71 and the remote control unit side cable 72 is attached to the shaft member 88 in such a way, when the operation handle 64 of the remote control unit 60 is operated, the operation force (pulling force) thereof is transmitted to the lock piece 52 of the lock 50 via the remote control unit side cable 72, the connector member 73, and the lock side cable 71.

When the operation handle 64 of the remote control unit 60 is released, the operation handle 64 is stowed in the operation cover 63, and the force of pulling the cable member 72*b* is cancelled. Then, the connector member 73 of the remote control restraint element 80 is moved to the vehicle body front side by the bias force of the compressed coil spring 86, and accordingly, a force of pulling the cable member 71*b* is also cancelled.

Next, the latch member 85 will be described. The latch member 85 has a main body portion 85*a* having a substantially plate shape, a hole portion (not shown), the claw portion 85*b*, and a cable member attachment portion 85*c*. This latch member 85 and the claw portion 85*b* respectively generally correspond to a pivot member and a locking portion described in the claims.

The hole portion formed in the latch member 85 is formed on the one end side of the main body portion 85*a*, and has a shape into which the pivot shaft 84 of the base member 83 is insertable. The latch member 85 is pivotably attached to the base member 83 by inserting the pivot shaft 84 of the base member 83 into the hole portion thereof and attaching with using a bolt or the like. In the latch member 85, the twist spring 87 is installed around an outer circumference of the pivot shaft 84 in a manner such that the claw portion 85*b* provided on the free end side of the latch member can be always biased to the side of the connector member 73. This twist spring 87 generally corresponds to a bias member described in the claims.

The claw portion 85*b* is formed to protrude into a convex shape from the free end side of the main body portion 85*a* toward the side of the connector member 73. This claw portion 85*b* is formed into a shape to be engageable with the engagement groove 73*b* of the connector member 73 in a state in which the latch member 85 is pivotably attached to the base member 83.

The cable member attachment portion 85*c* is formed on the lower side of the claw portion 85*b* in the main body portion 85*a*, and provided in a manner that a cable member 82*b* of the second operation cable 82 described later is attachable by a screw, a bolt, or the like.

In such a way, unless receiving a pulling force from the second operation cable 82 described later, the free end side of the latch member 85 is always biased to the side of the connector member 73 by the twist spring 87.

Therefore, in a state in which the operation handle 64 of the remote control unit 60 is not operated, that is, in a state in which the connector member 73 is biased by the compressed coil spring 86, and in a state in which the pulling force from the second operation cable 82 is not received, the claw portion 85*b* of the latch member 85 is always engaged with the engagement groove 73*b* of the connector member 73. In this state, movement of the connector member 73 to the vehicle body rear side is restrained. In a state in which a pivot operation force from the second operation cable 82 is received, an engagement state of these portions is cancelled, so that the movement of the connector member 73 to the vehicle body rear side is permitted.

Next, the second operation cable 82 will be described with reference to FIGS. 1, 3, 7, and 8.

As shown in FIGS. 1, 3, and 7, the second operation cable 82 has the tube member 82*a* made of a flexible member and the cable member 82*b* made of a linear member as well as the first operation cable 70, and couples the fixing pin 32 of the armrest 30 and the cable member attachment portion 85c of the latch member 85. The second operation cable 82 is arranged between the back side of the surface layer material (not shown) or the like disposed on the wall surface of the vehicle body floor 2 and the vehicle 1, and the vehicle body, while maintaining a predetermined curvature radius without bending.

The tube member 82a and the cable member 82b on the side of the second lock 81 are respectively attached to the lower wall portion 83d of the base member 83 of the remote control restraint element 80 and the cable member attachment portion 85c of the latch member 85 by a bolt, a screw, or the like.

Figure 8:
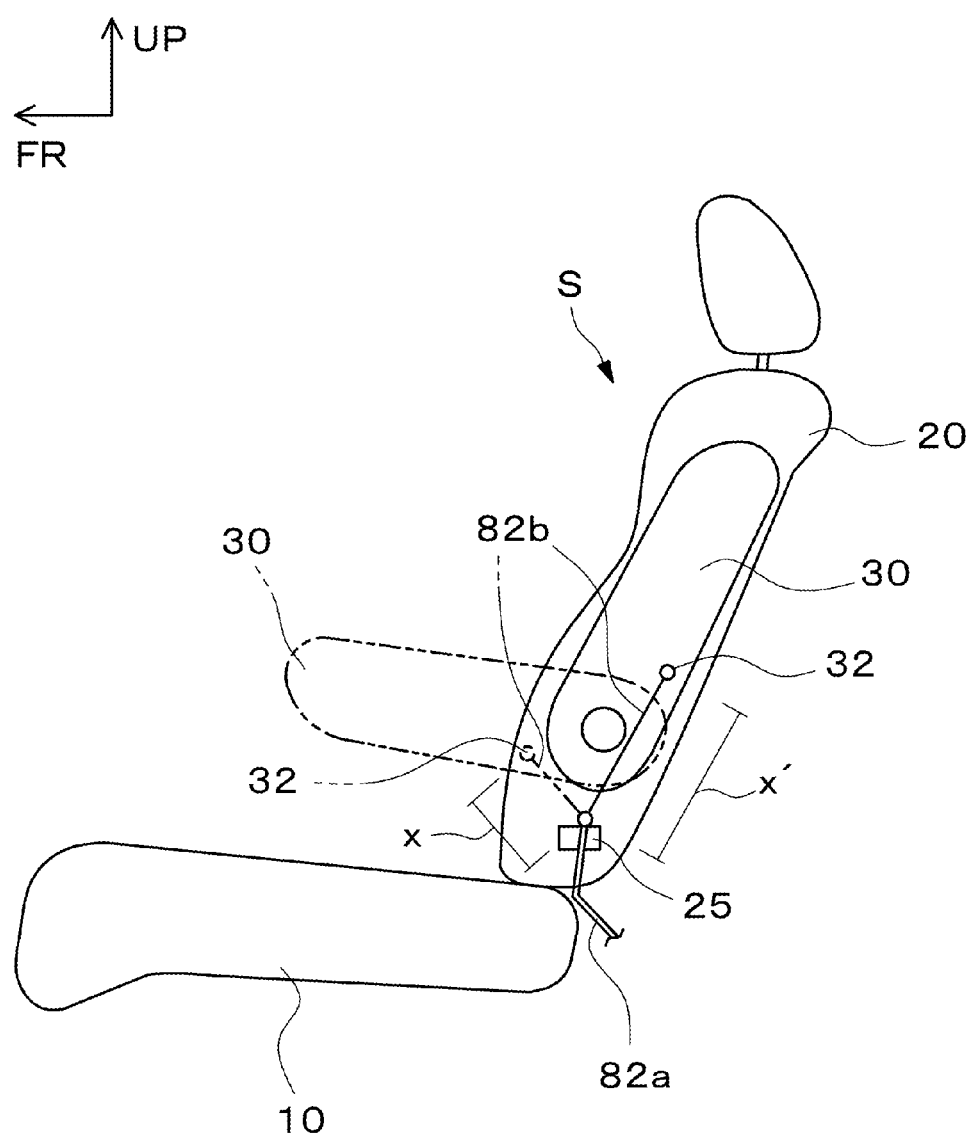
FIG. 8 is a schematic side view showing arrangement positions of a fixing pin provided in the armrest.

As shown in FIG. 8, the tube member 82a on the side of the armrest 30 is attached at a predetermined position of the platform portion 22 or the like of the seat back 20 via a fixing member 25 (refer to FIG. 3). The cable member 82b on the side of the armrest 30 is fixed to the fixing pin 32 of the armrest 30.

The attachment positions of the fixing pin 32 of the armrest 30 to which to cable member 82b is fixed will be described with reference to FIG. 8.

The fixing pin 32 is attached to the left side frame 30b of the armrest 30 in a manner such that a distance x to the fixing member 25 when the armrest 30 is at the use position (position of an imaginary line in FIG. 8) is shorter than a distance x' when the armrest is at the stowed position (position of a solid line in FIG. 8) (refer to FIG. 3).

By arranging the fixing pin 32 in such a way, the cable member 82b of the second operation cable 82 is pulled to the side of the armrest 30 when the armrest 30 is moved from the use position to the stowed position. The latch member 85 is pivoted upon receiving this pulling force, so that the engagement state of the claw portion 85b thereof and the engagement groove 73b of the connector member 73 is cancelled.

Next, operations of the stowing device of the vehicle seat according to the present embodiment will be described dividing into a case where the armrest is at the stowed position and a case where the armrest is at the use position.

As shown in FIGS. 7 and 8, when the armrest 30 is moved from the use position to the stowed position, the cable member 82b fixed to the armrest 30 is pulled to the side of the armrest 30. Accordingly, the latch member 85 of the remote control restraint element 80 is pivoted in the direction in which the latch member is brought away from the connector member 73 against a bias force of the twist spring 87, so that the engagement state of the claw portion 85b thereof and the engagement groove 73b of the connector member 73 is cancelled.

In this state, when the operation handle 64 of the remote control unit 60 is pulled to the near side against the bias force of the twist spring 66, the cable member 72b of the remote control unit side cable 72 is pulled toward the vehicle body rear side, and the pulling force is transmitted to the lock piece 52 of the lock 50 via the connector member 73 and the cable member 71b of the lock side cable 71.

When such a pulling force is transmitted to the lock 50, the lock piece 52 is pivoted against the bias force of the twist spring, and the lock 50 is shifted from the lock state in which the lock is engaged with the striker 6 to the lock cancellation state in which engagement is cancelled. When the lock 50 is brought into the lock cancellation state, the seat back 20 is pivoted to the vehicle body front side by the bias force of the bias element 40 and moved from the seated position to the pull-down state.

When the armrest 30 is moved from the stowed position to the use position, the cable member 82b fixed to the armrest 30 is moved to the side of the second lock 81. Then, the latch member 85 of the remote control restraint element 80 is pivoted and moved to the side of the connector member 73 by the bias force of the twist spring 87, to be brought into the engagement state in which the claw portion 85b thereof and the engagement groove 73b of the connector member 73 are engaged.

In this state, even when the operation handle 64 of the remote control unit 60 is operated, the movement of the connector member 73 is restrained by the claw portion 85b of the latch member 85, so that the operation force thereof is not transmitted to the lock piece 52 of the lock 50 via the cable member 72b, the connector member 73, and the cable member 71b.

In such a way, in the present embodiment, at the time of enlarging the space of the load chamber portion 3, without directly operating the operation portion 90 provided in the seat back 20, the seat back 20 can be moved to the pull-down position. Thus, enlarging operation of the space of the load chamber portion 3 can be easily and promptly performed. As a matter of course, the seat back 20 can also be moved to the pull-down position by operating the operation lever 92 of the operation portion 90.

Even when the operation handle 64 of the remote control unit 60 is operated with the armrest 30 not at the stowed position, the seat back 20 is not moved from the seated position to the pull-down position. Thus, deformation or the like of the armrest 30 in accordance with movement of the seat back 20 to the pull-down position can be reliably avoided, and a disadvantage that the seat back 20 is stopped before reaching the pull-down position can be prevented.

The bias force is always applied to the latch member 85 having the claw portion 85b in the direction in which the claw portion 85b is engaged with the engagement groove 73b of the connector member 73 by the twist spring 87. Thus, the engagement groove 73b and the claw portion 85b can be reliably and firmly engaged. Therefore, even when improper operation of the remote control unit 60 is performed with the armrest 30 at the use position, pull-down of the seat back 20 can be reliably prevented.

In the above embodiment, in a state in which the armrest 30 is moved from the stowed position to the use position (refer to FIG. 7A) during the operation of the remote control unit 60 (refer to FIG. 7B), and in the case where the operation of the remote control unit 60 is stopped after that, the connection member 73 starts the movement to the vehicle body front side in a state in which the side of the claw portion 85b of the latch member 85 finishes pivoting to the side of the connection member 73 by the bias force of the twist spring 87. In such a case, since the guide portion 73e having a substantially-arc-shape section is formed in the connection member 73, the connector member 73 can be smoothly moved to the vehicle body front side while being abutted with a front end of the claw portion 85b of the latch member 85 until the engagement groove 73b of the connector member 73 and the claw portion 85b are engaged. Therefore, in the case where the armrest 30 is at the use position and even in a state in which the claw portion 85b of the latch member 85 and the engagement groove 73b of the connector member 73 are not engaged, these portions can be smoothly and reliably engaged.

Figure 10:
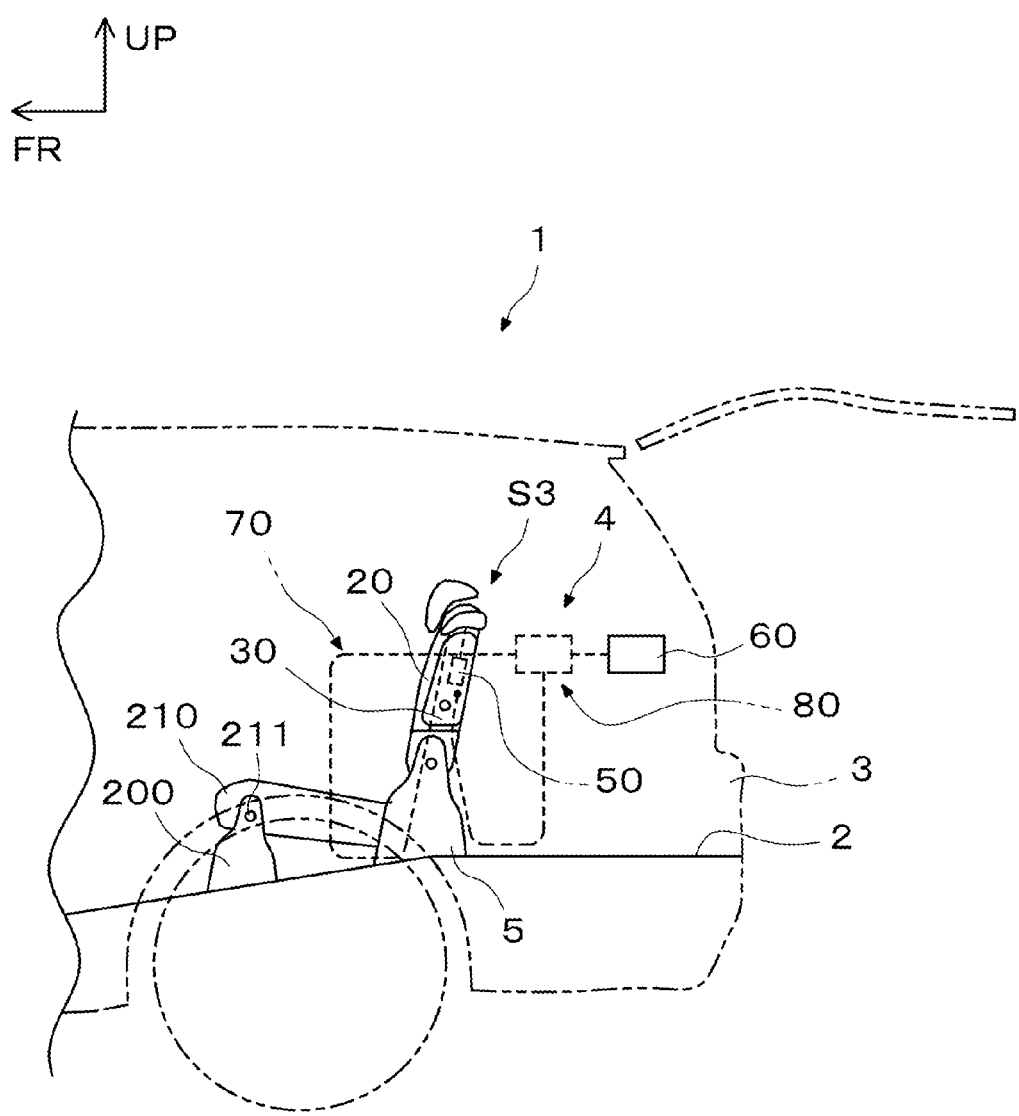
FIG. 10 is a schematic side view of a vehicle rear part of a vehicle seat according to a second embodiment of the present invention.
Figure 11:
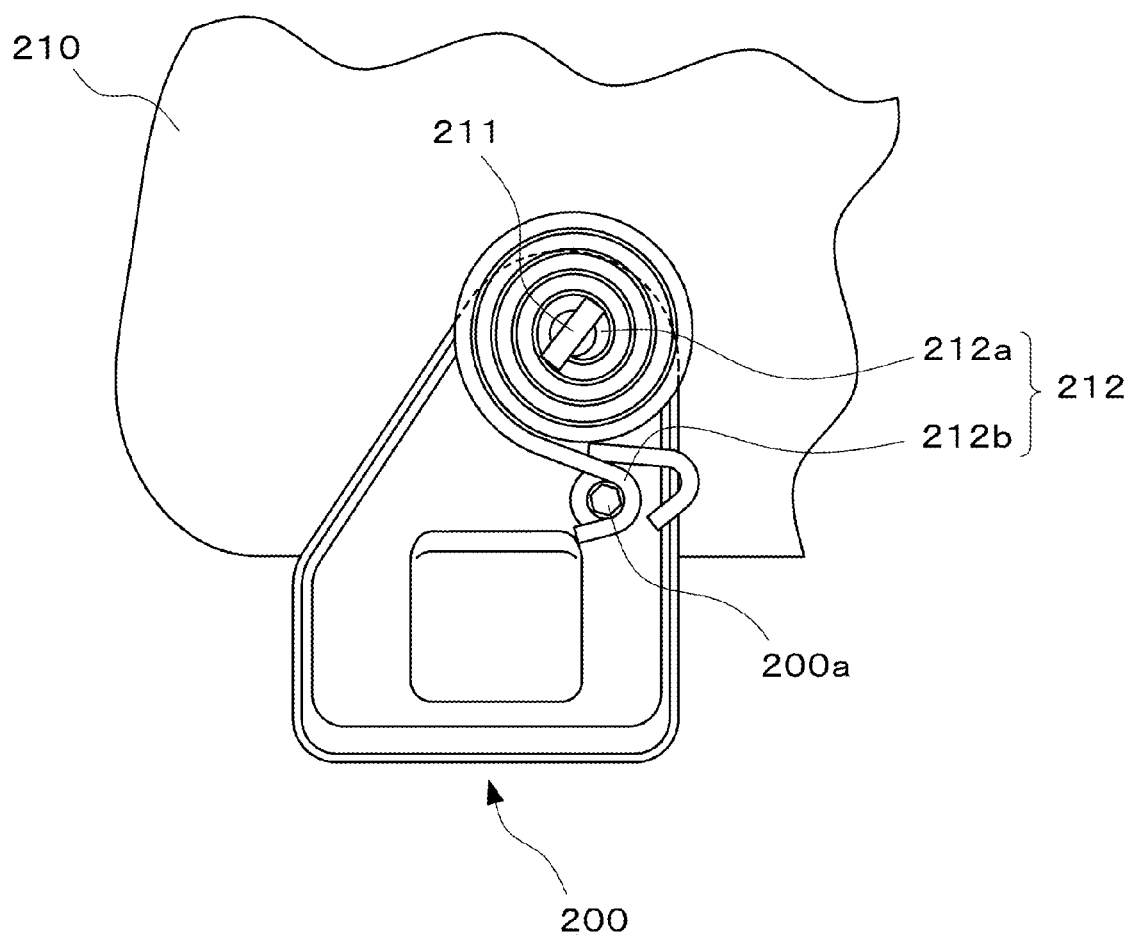
FIG. 11 is an enlarged side view of major parts of a seat cushion.

Next, a second embodiment according to the present invention will be described based on FIGS. 10 and 11. FIG. 10 is a schematic side view of a vehicle rear part of a vehicle seat according to the second embodiment, and FIG. 11 is an enlarged side view of major parts of a seat cushion. The second embodiment shown in FIGS. 10 and 11 is different from the vehicle seat of the first embodiment described above only in terms of a configuration of the seat cushion, but is the same as the first embodiment in terms of other configurations. Thus, the same reference numerals will be given, and duplicated description will be omitted.

As shown in FIGS. 10 and 11, a seat cushion 210 of a vehicle seat S3 according to the present embodiment has a pair of pivot shafts 211 respectively protruding from both the right and left sides near a front end thereof to the outer sides in the lateral direction, and second bias element 212 respectively attached to the pivot shafts 211.

The pivot shaft 211 is inserted through a hole portion (not shown) formed in a support member 200 fixed at a predetermined position of the vehicle body floor 2 by a bolt or the like, and the seat cushion 210 is pivotably supported on the vehicle body floor 2 taking the pivot shaft 211 as a pivot center.

The second bias element 212 is a spiral spring as well as the bias element 40 described above, having one end 212a locked onto the pivot shaft 211 and the other end 212b caught and locked onto a locking pin 200a protrudingly formed in the support member 200, and applies a bias force in a manner that the seat cushion 210 is pivotable to the vehicle body front side taking the pivot shaft 211 as a pivot center.

The seat cushion 210 is provided with a lock mechanism (not shown) engageable with and disengageable from a striker (not shown) attached to the vehicle body floor 2 in a bottom surface portion thereof on the vehicle body rear side.

The seat cushion 210 configured in such a way is maintained at a seated position where the passenger can be seated on the seat cushion 210 against the bias force of the second bias element 212 in a state in which the striker and the lock mechanism are engaged. In a state in which an engagement state with the striker is cancelled by operation of an operation portion (not shown) provided at a predetermined position of the vehicle seat S3, the seat cushion 210 is pivoted and moved to a position where the bottom surface side of the seat cushion 210 becomes the upper side (hereinafter, referred to as a stowed position) by the bias force of the second bias element 212.

In such a way, in the present embodiment, the seat cushion 210 can also be moved in addition to the seat back 20. Thus, the load chamber space of the load chamber portion 3 can be further enlarged.

In the second embodiment, the engagement state of the striker and the lock mechanism can be cancelled by the operation of the operation portion provided in the vehicle seat S3. However, as well as the seat back 20, the engagement state may also be cancelled by the operation of the remote control unit 60 provided on a rear wall side surface of the load chamber portion 3.

In the above embodiments, the vehicle seat is configured to restrain the movement of the seat back to the pull-down position when the armrest is at the use position. However, various embodiments of the present invention can also be applied to a vehicle seat in which a seat cushion can be flipped up and folded. In such a case, by similarly providing a lock for locking/permitting movement of the seat cushion from a seated position to a flip-up position (folded position), a remote control unit capable of remotely controlling the lock, a restraint element for restraining remote control, and the like, the movement of the seat cushion to the flip-up position can be restrained when the armrest is at the use position.

Accordingly, the seat cushion or the seat back described herein can be reliably moved to the folded position by remote control without the deformation or the like of the armrest, and can be utilized as a vehicle seat provided with an armrest to be installed in various types of vehicles.

TABLE OF REFERENCE CHARACTERS

1: Vehicle
2: Vehicle body floor
3: Load chamber portion
4: Seat stowing device
5, 200: Support member
5a, 200a: Locking pin
6: Striker
10, 210: Seat cushion
20, 120: Seat back
21: Seat back main body
21a: Right side frame
22, 122: Platform portion
23: Pivot shaft
24: Axis
25: Fixing member
30, 130: Armrest
30a: Headrest
30b: Left side frame
30c: Right side frame
32: Fixing pin
40: Bias element
40a: One end
40b: Other end
50: Lock
51: Base portion
52: Lock piece
53: Coupling portion
53a: One end
53b: Other end
60: Remote control unit
63: Operation cover
64: Operation handle
64a: Grip portion
64b: Attachment portion
64c: Long hole
65: Shaft portion
66: Twist spring
70: First operation cable (coupling element)
71: Lock side cable (lock side coupling member)
71a: Tube member
71b: Cable member
72: Remote control unit side cable (remote control unit side coupling member)
72a: Tube member
72b: Cable member
73: Connector member (connection member)
73b: Engagement groove (engagement portion)
73c: First cable attachment portion
73d: Second cable attachment portion
73e: Guide portion
80: Remote control restraint element (restraint element)
81: Second lock (switch)
82: Second operation cable (conjunction element)
82a: Tube member
82b: Cable member
83: Base member
83a: Base portion
83b: Front wall portion
83c: Rear wall portion
83d: Lower wall portion
84: Pivot shaft
85: Latch member (pivot member)

85a: Main body portion
85b: Claw portion (locking portion)
85c: Cable member attachment portion
86: Compressed coil spring
87: Twist spring (bias member)
88: Shaft member
89: Stopper member
90: Operation portion
91: Operation cover
92: Operation lever
93: Coupling rod
120a: Concave portion
211: Pivot shaft
212: Second bias element
212a: One end
212b: Other end
S1, S2, S3: Vehicle seat

The invention claimed is:

1. A vehicle seat, comprising:
a seat cushion;
a seat back; and
an armrest movable between a use position and a stowed position;
wherein:
at least one of the seat cushion and the seat back is movable from a seated position to a folded position, and
the vehicle seat comprises a restraint element for restraining movement of the movable seat cushion or the movable seat back in a direction of the folded position when the armrest is at the use position;
the vehicle seat further comprising:
a bias element for biasing the seat back or the seat cushion in a direction in which the seat back or the seat cushion is moved from the seated position to the folded position;
a lock capable of being selectively switched between a lock state in which the seat back is fixable at the seated position and a lock cancellation state in which movement of the seat back from the seated position to the folded position is permitted;
a remote control unit capable of shifting the lock from the lock state to the lock cancellation state; and
a coupling element for coupling the lock and the remote control unit;
wherein:
the coupling element comprises:
a lock side coupling member connected to the lock;
a remote control unit side coupling member connected to the remote control unit; and
a connection member for connecting the lock side coupling member and the remote control unit side coupling member,
the restraint element comprises:
a conjunction element movable in conjunction with movement of the armrest; and
a switch connected to the conjunction element, capable of being selectively switched between a movement restraint state in which movement of the connection member is restrained when the armrest is moved to the use position, and a movement permission state in which the movement of the connection member is permitted when the armrest is moved to the stowed position, and
the restraint element restrains the lock from shifting from the lock state to the lock cancellation state by operation of the remote control unit.

2. The vehicle seat according to claim 1, wherein:
the connection member comprises an engagement portion, and
the switch comprises:
a base member;
a pivot member having a locking portion engageable with the engagement portion, connected to the conjunction element, and pivotably supported on the base member; and,
a bias member for biasing the pivot member in a direction in which the locking portion and the engagement portion are engaged.

3. The vehicle seat according to claim 2, wherein:
a guide portion for guiding the locking portion in a manner that the locking portion is engaged with the engagement portion is formed in the connection member.

4. The vehicle seat according to claim 3, wherein the guide portion has a substantially-arc-shape curved surface.

5. The vehicle seat according to claim 2, wherein:
the lock side coupling member and the remote control unit side coupling member respectively comprise cables;
the engagement portion of the connection member is disposed between the cable of the lock side coupling member and the cable of the remote control unit side coupling member; and
the locking portion of the switch is located below the engagement portion.

6. The vehicle seat according to claim 1, wherein the remote control unit is disposed at a rear of and away from the seat back.

7. The vehicle seat according to claim 1, wherein the switch is disposed between the seat back and the remote control unit in a front-to-rear direction.

8. A vehicle seat, comprising:
a seat cushion;
a seat back; and
an armrest movable between a use position and a stowed position;
wherein:
at least one of the seat cushion and the seat back is movable from a seated position to a folded position, and
the vehicle seat comprises a restraint element for restraining movement of the movable seat cushion or the movable seat back in a direction of the folded position when the armrest is at the use position;
the vehicle seat further comprising:
a bias element for biasing the seat back or the seat cushion in a direction in which the seat back or the seat cushion is moved from the seated position to the folded position;
a lock capable of being selectively switched between a lock state in which the seat back is fixable at the seated position and a lock cancellation state in which movement of the seat back from the seated position to the folded position is permitted;
a remote control unit capable of shifting the lock from the lock state to the lock cancellation state; and
a coupling element for coupling the lock and the remote control unit;
wherein:
the coupling element comprises:
a lock side coupling member connected to the lock;
a remote control unit side coupling member connected to the remote control unit; and
a connection member for connecting the lock side coupling member and the remote control unit side coupling member, the restraint element comprises:
- a conjunction element movable in conjunction with movement of the armrest; and
- a switch connected to the conjunction element, capable of being selectively switched between a movement restraint state in which movement of the connection member is restrained when the armrest is moved to the use position, and a movement permission state in which the movement of the connection member is permitted when the armrest is moved to the stowed position, the restraint element restrains the lock from shifting from the lock state to the lock cancellation state by operation of the remote control unit; and the lock side coupling member, the remote control unit side coupling member, and the conjunction element respectively comprise cables.

9. The vehicle seat according to claim 8, wherein:
the connection member comprises an engagement portion, and
the switch comprises:
- a base member;
- a pivot member having a locking portion engageable with the engagement portion, connected to the conjunction element, and pivotably supported on the base member; and,
- a bias member for biasing the pivot member in a direction in which the locking portion and the engagement portion are engaged.

10. The vehicle seat according to claim 9, wherein:
a guide portion for guiding the locking portion in a manner that the locking portion is engaged with the engagement portion is formed in the connection member.

11. The vehicle seat according to claim 10, wherein the guide portion has a substantially-arc-shape curved surface.

12. The vehicle seat according to claim 9, wherein:
the engagement portion of the connection member is disposed between the cable of the lock side coupling member and the cable of the remote control unit side coupling member; and
the locking portion of the switch is located below the engagement portion.

13. The vehicle seat according to claim 8, wherein the remote control unit is disposed at a rear of and away from the seat back.

14. The vehicle seat according to claim 8, wherein the switch is disposed between the seat back and the remote control unit in a front-to-rear direction.

15. A vehicle seat, comprising:
a seat cushion;
a seat back; and
an armrest movable between a use position and a stowed position;
wherein:
at least one of the seat cushion and the seat back is movable from a seated position to a folded position,
the vehicle seat further comprising:
- a lock disposed at a position away from the armrest, and selectively switchable between a lock state in which the movable seat cushion or the movable seat back is fixed at the seated position and a lock cancellation state in which movement of the movable seat cushion or the movable seat back from the seated position to the folded position is permitted;
- a remote control unit disposed at a position away from the vehicle seat, and that shifts the lock from the lock state to the lock cancellation state; and
- a restraint element for restraining movement of the movable seat cushion or the movable seat back in a direction of the folded position by restraining movement of the remote control unit when the armrest is at the use position.

16. The vehicle seat according to claim 15, further comprising:
a conjunction element movable in conjunction with movement of the armrest;
a connection member that comprises an engagement portion, and
a switch that comprises:
- a base member;
- a pivot member having a locking portion engageable with the engagement portion, connected to the conjunction element, and pivotably supported on the base member; and,
- a bias member for biasing the pivot member in a direction in which the locking portion and the engagement portion are engaged.

17. The vehicle seat according to claim 16, wherein:
a guide portion for guiding the locking portion in a manner that the locking portion is engaged with the engagement portion is formed in the connection member.

18. The vehicle seat according to claim 17, wherein the guide portion has a substantially-arc-shape curved surface.

19. The vehicle seat according to claim 15, wherein the remote control unit is disposed at a rear of and away from the seat back.

20. The vehicle seat according to claim 16, wherein the switch is disposed between the seat back and the remote control unit in a front-to-rear direction.

* * * * *